US010659424B2

United States Patent
Jheeta et al.

(10) Patent No.: US 10,659,424 B2
(45) Date of Patent: May 19, 2020

(54) DETERMINING STATUS OF DOMAIN NAME REGISTRATION

(71) Applicant: Go Daddy Operating Company, LLC, Scottsdale, AZ (US)

(72) Inventors: Moninder Jheeta, Fremont, CA (US); Charles Beadnall, San Mateo, CA (US); Christopher Ambler, Palo Alto, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 809 days.

(21) Appl. No.: 15/139,245

(22) Filed: Apr. 26, 2016

(65) Prior Publication Data
US 2017/0310636 A1  Oct. 26, 2017

(51) Int. Cl.
*H04L 29/12* (2006.01)

(52) U.S. Cl.
CPC ........ *H04L 61/1511* (2013.01); *H04L 61/302* (2013.01)

(58) Field of Classification Search
CPC .............. H04L 61/1511; H04L 61/302; G06F 17/30864; G06F 17/30312
See application file for complete search history.

(56) References Cited

U.S. PATENT DOCUMENTS

| 2011/0060950 A1* | 3/2011 | Waldron | G06F 11/1451 714/48 |
| 2012/0173681 A1* | 7/2012 | Gould | H04L 29/12066 709/221 |
| 2015/0058330 A1* | 2/2015 | Carroll | G06F 17/30867 707/723 |

OTHER PUBLICATIONS

S. Hollenbeck. Network Working Group. "RFC 5731—Extensible Provisioning Protocol (EPP) Domain Name Mapping." Retrieved on Dec. 18, 2018 from <https://tools.ietf.org/html/rfc5731> (Year: 2009).*

.Amsterdam, DRS EPP manual; Feb. 20, 2015. "Using EPP with the DRS Domain Registration System for .amsterdam." Retrieved on Dec. 18, 2018 from <https://nic.amsterdam/wp-content/uploads/2015/04/DRS.amsterdam_Manual_EPP_EN_v1.0.pdf> (Year: 2015).*

* cited by examiner

*Primary Examiner* — Shean Tokuta
*Assistant Examiner* — Juan C Turriate Gastulo
(74) *Attorney, Agent, or Firm* — Greenberg Traurig, LLP

(57) ABSTRACT

A registrar may determine a registration status for a domain names. The registrar may determine whether the domain name is in a zone file downloaded from a registry. Upon determining that the domain name is not in the zone file, the registrar may determine whether the domain name is in a DNS zone file created by the registrar. Upon determining that the domain name is not in the DNS zone file created by the registrar, the registrar may transmit an EPP <check> command for the domain name to the registry. The registrar may receive a first EPP <resData> element comprising an error indicating the domain name is available or a value indicating the domain name is not available. Upon receiving the value indicating the domain name is not available, the registrar may transmit an EPP <info> command for the domain name to the registry. The registrar may receive a second EPP <resData> element from the registry comprising an expiration date and a state of the domain name.

20 Claims, 8 Drawing Sheets

DETERMINING STATUS OF DOMAIN NAME REGISTRATION

FIELD OF THE INVENTION

A multipronged method that quickly and reliably determines a registration status for each domain name in a plurality of domain names.

SUMMARY OF THE INVENTION

The invention allows a registration status of a domain name to be quickly and reliably determined by a domain name registrar. In a first embodiment, particular steps and checks are done sequentially which may minimize unnecessary steps and saves resources of the registrar.

The registrar may start by determining whether or not a domain name is in a zone file downloaded by the registrar from a registry. If the domain name is in the zone file, the domain name may be considered as registered and the process may be stopped and/or restarted for a different domain name.

Upon determining by the registrar that the domain name is not in the zone file (the registration status is not known) downloaded from the registry, the registrar may determine whether or not the domain name is in a DNS zone file created by the registrar. If the domain name is in the DNS zone file created by the registrar, the domain name may be considered registered and the process may be stopped and/or restarted for a different domain name.

Upon determining by the registrar that the domain name is not in the DNS zone file created by the registrar, the registrar may transmit an Extensible Provisioning Protocol (EPP) <check> command for the domain name to the authoritative registry for the top level domain (TLD) of the domain name.

In response to the EPP <check> command for the domain name, the registrar may receive from the registry a first EPP <resData> element comprising an error indicating the domain name is available or a value indicating the domain name is not available. If the first EPP <resData> element comprises an error, the domain name may be considered as available. The domain name may be marked as available and the process may be stopped and/or restarted for a different domain name. In addition, the available domain name may be offered to a potential domain name registrant or registrants for domain name registration.

Upon receiving by the registrar the value indicating the domain name is not available from the registry, the registrar may transmit an EPP <info> command for the domain name to the registry. The registrar may receive a second EPP <resData> element from the registry comprising an expiration date and/or a state of the domain name. This data may be saved for later reference. The domain name may be marked as unavailable and the process may be stopped and/or restarted for a different domain name.

In a second embodiment, the three steps of 1) checking the downloaded zone file, 2) checking the registrar created DNS zone file and 3) transmitting the EPP <check> command for the domain name to the registry may be concurrently performed. In addition, the step of transmitting the EPP <info> command may also be sent to the registry and concurrently performed with the other three steps. These embodiments have the advantage of being very fast, but performing the steps concurrently uses more resources of the registrar compared to performing these steps in sequence.

These embodiments to determine a registration status for a domain name may be repeated for each domain name in a plurality of domain names.

The above features and advantages of the present invention will be better understood from the following detailed description taken in conjunction with the accompanying drawings.

DETAILED DESCRIPTION

Figure 1:
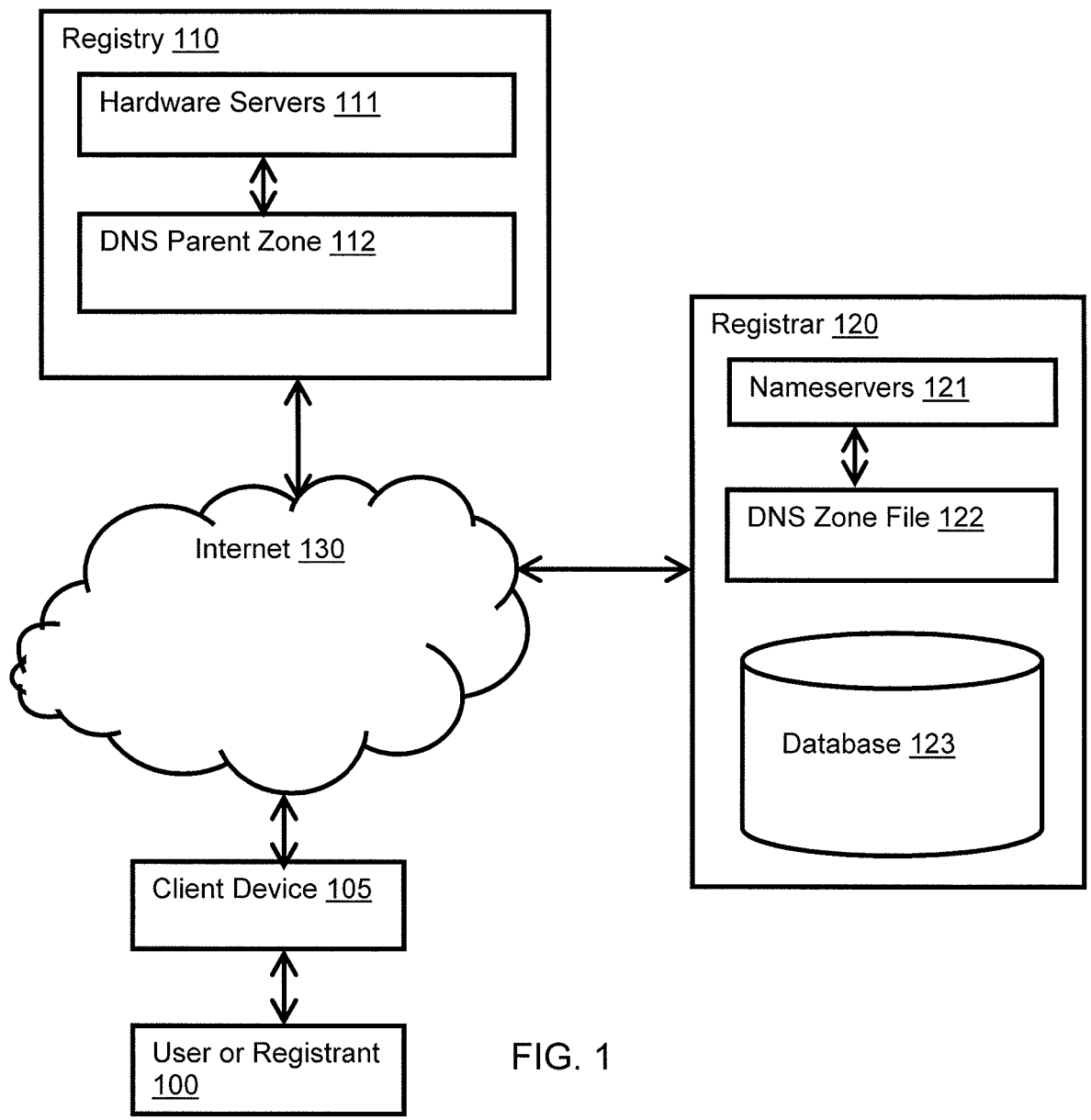
FIG. 1 is a block diagram of a system that may be used to determine a registration status for one or more domain names.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system that may be used to determine a registration status of a domain name. While FIG. 1 only illustrates a single client device 105, a single registry 110, a single registrar 120 to make it easier to describe and understand the invention, it should be understood that the invention may be practice as part of a larger computer network, where any number of client devices, registries and registrars may all be used and interconnected.

The arrows between the client device 105, registry 110, registrar 120 and Internet 130 represent one or more computer networks. Communications and transmissions over the computer networks may use any currently known or developed in the future methods or protocols.

A computer network is a collection of links and nodes (e.g., multiple computers and/or other devices connected together) arranged so that information may be passed from one part of the computer network to another part of the computer network over multiple links and through various nodes. Non-limiting examples of computer networks include the Internet 130, a public switched telephone network, a global Telex network, an intranet, an extranet, a local-area network, a wide-area network, wired networks, wireless networks and/or cell phone networks.

The Internet 130 is a worldwide network of hardware servers and computer networks arranged to allow for the easy and robust exchange of information between, for example, a user (who may be a domain name registrant or registrant 100) using a client device 105 and one or more websites hosted on one or more hosting servers.

Hardware servers and nameservers 121 are hereby defined to be physical machines. While hardware servers and nameservers 121 comprise the hardware necessary to run software, the hardware servers and nameservers 121 are hereby defined to not be merely or only software. Hardware servers and nameservers 121 may be, as non-limiting examples, one or more Dell PowerEdge(s) rack server(s), HP Blade Servers, IBM Rack or Tower servers, although other types of hardware servers and/or combinations of other hardware servers may also be used.

Hundreds of millions of Internet users around the world have access to client devices connected to the Internet 130. A user may use a client device 105, such as, as non-limiting examples, a cell phone, personal digital assistant (PDA), tablet, laptop or desktop computer to access a website or other resource via the Internet 130. Users are able to access data at specific locations on the Internet 130 referred to as websites. Each website may consist of a single webpage, but typically consist of multiple interconnected and related webpages. Websites may, as a non-limiting example, be created using HyperText Markup Language (HTML) to generate a standard set of tags that define how the webpages for the website are to be displayed.

Hosting providers may provide the hardware, such as hosting servers, and infrastructure necessary to host one or more websites, possibly for a plurality of domain name registrants who are website operators/owners. Menus, links, tabs, etc. may be used by a user to move between different web pages within a website or to move to a different webpage on a different website. The combination of all the websites and their corresponding web pages on the Internet 130 is generally known as the World Wide Web (WWW) or simply the Web.

Users may access websites using software known as an Internet browser, such as MICROSOFT INTERNET EXPLORER, GOOGLE CHROME or MOZILLA FIREFOX. After the browser has located a desired webpage in a desired website, the browser may request and receive information regarding the webpage, typically in the form of an HTML document, and then displays the webpage for the user on the user's client device. The user may view other webpages at the same website or move to an entirely different website using the browser.

Browsers are able to locate specific websites because each website has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

However, IP addresses, even in human readable notation, are difficult for users to remember and use. A domain name is easier to remember and may be associated with an IP Address to a website on the Internet 130. A browser may be able to access the website on the Internet 130 through the use of the domain name and the domain name system (DNS).

Domain names are much easier to remember and use than their corresponding IP addresses. The Internet Corporation for Assigned Names and Numbers (ICANN) and the Internet Assigned Numbers Authority (IANA) create rules and coordinate the use of over 1,000 Top-Level Domains (TLDs). Each TLD is typically assigned a single registry 110 to be an authoritative source of information (the particular data stored by the registry 110 varies depending on the TLD) for all domain names registered by the registry 110. One or more domain name registrars may register domain names to users (domain name registrants or registrants) on behalf of a registry 110.

The DNS may comprise hardware servers and files that are cooperatively operated by different entities (such as registries and registrars) that are preferably geographically dispersed to minimize potential damage from natural or intentional causes. The DNS is a hierarchical distributed naming system for websites (and other resources) connected to the Internet 130. The DNS is also an Internet service that translates a domain name into an IP Address that may, for example, point to, i.e., be the address for, a website. As an example, a browser may transmit the domain name johndoe.com to a nameserver of the DNS and the nameserver may translate the domain name johndoe.com into the IP Address of 111.222.121.123. The browser may then use the IP Address to find the website associated with the domain name johndoe.com.

As part of the DNS, each registry 110 may comprise one or more hardware servers 111 that may be used to store and manage a DNS parent zone 112 for a TLD. The DNS parent zone 112 may store, as non-limiting examples, a plurality of domain names (each having the same TLD) and associated records, where each domain name is associated with at least one nameserver.

As part of the DNS, domain name registrars (registrars) comprise one or more hardware servers and one or more nameservers 121 and domain name registries (registries) comprise one or more hardware servers 111. Each nameserver also comprises one or more hardware servers that are connected to the Internet 130. The nameservers 121 are able to translate domain names into IP addresses in response to queries from browsers.

The process for registering a domain name with .com, .net, .org, and some other TLDs allows a user to use an ICANN-accredited domain name registrar 120 to register a domain name. For example, if a user, John Doe, wishes to register the domain name "johndoe.com," John Doe may initially determine whether the desired domain name is available by contacting a domain name registrar 120. The user or potential domain name registrant 100 may make this contact using the registrar's website and typing the desired domain name into a field on a webpage of the registrar's website created for this purpose.

Upon receiving a domain name or a domain name search request from the user, the registrar 120 may ascertain whether "johndoe.com" has already been registered. The results of the search may be displayed on the webpage to notify the user of the availability of the desired domain name.

In addition to requests for potential domain name registrants, there are other times a registrar 120 may want to know which domain names in a plurality of domain names are available and which domain names in the plurality of domain names are registered/unavailable.

Figure 2:
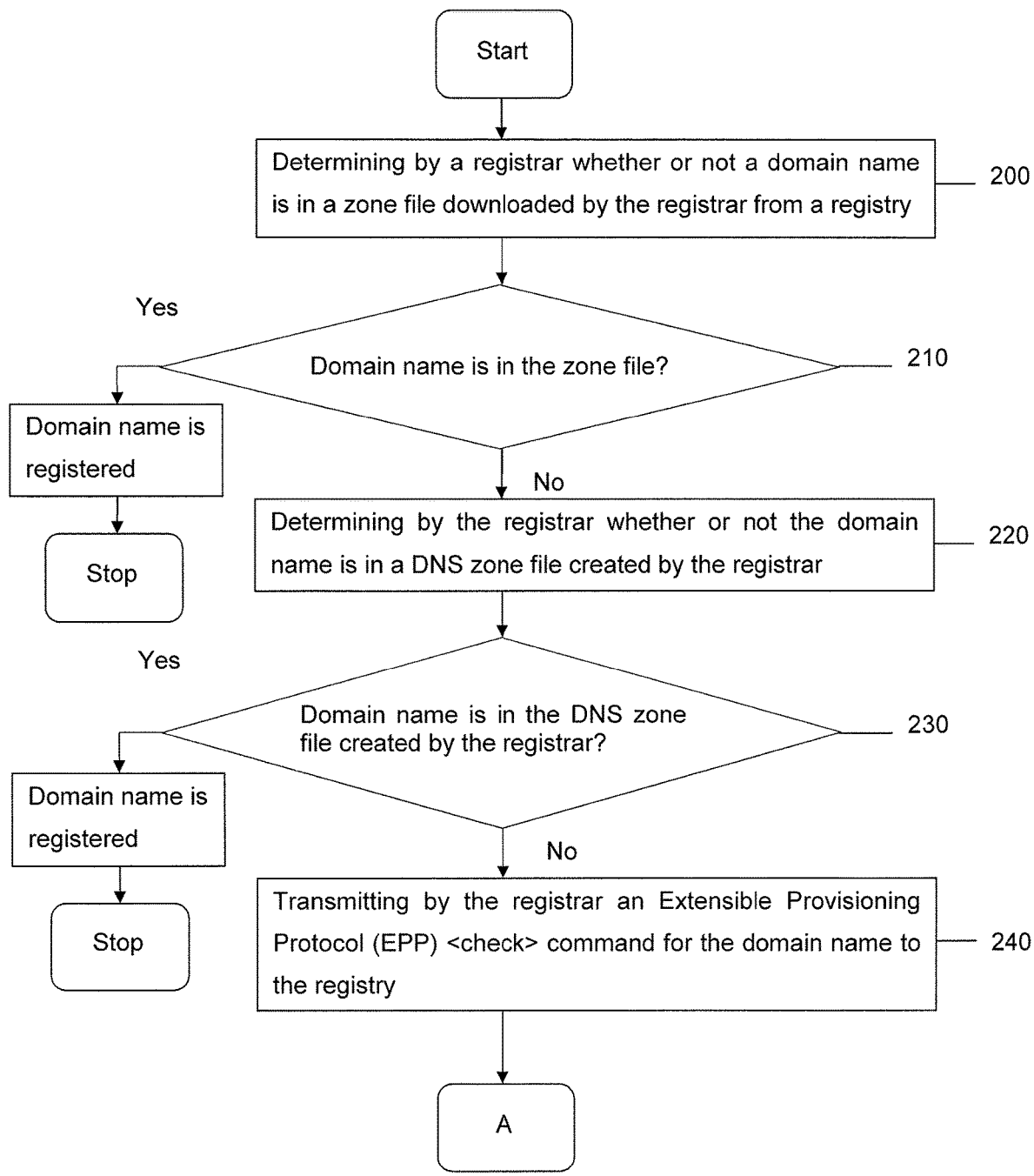
FIGS. 2-3 are flowcharts illustrating a method that reduces the amount of resources used to determine a registration status for one or more domain names.
Figure 3:
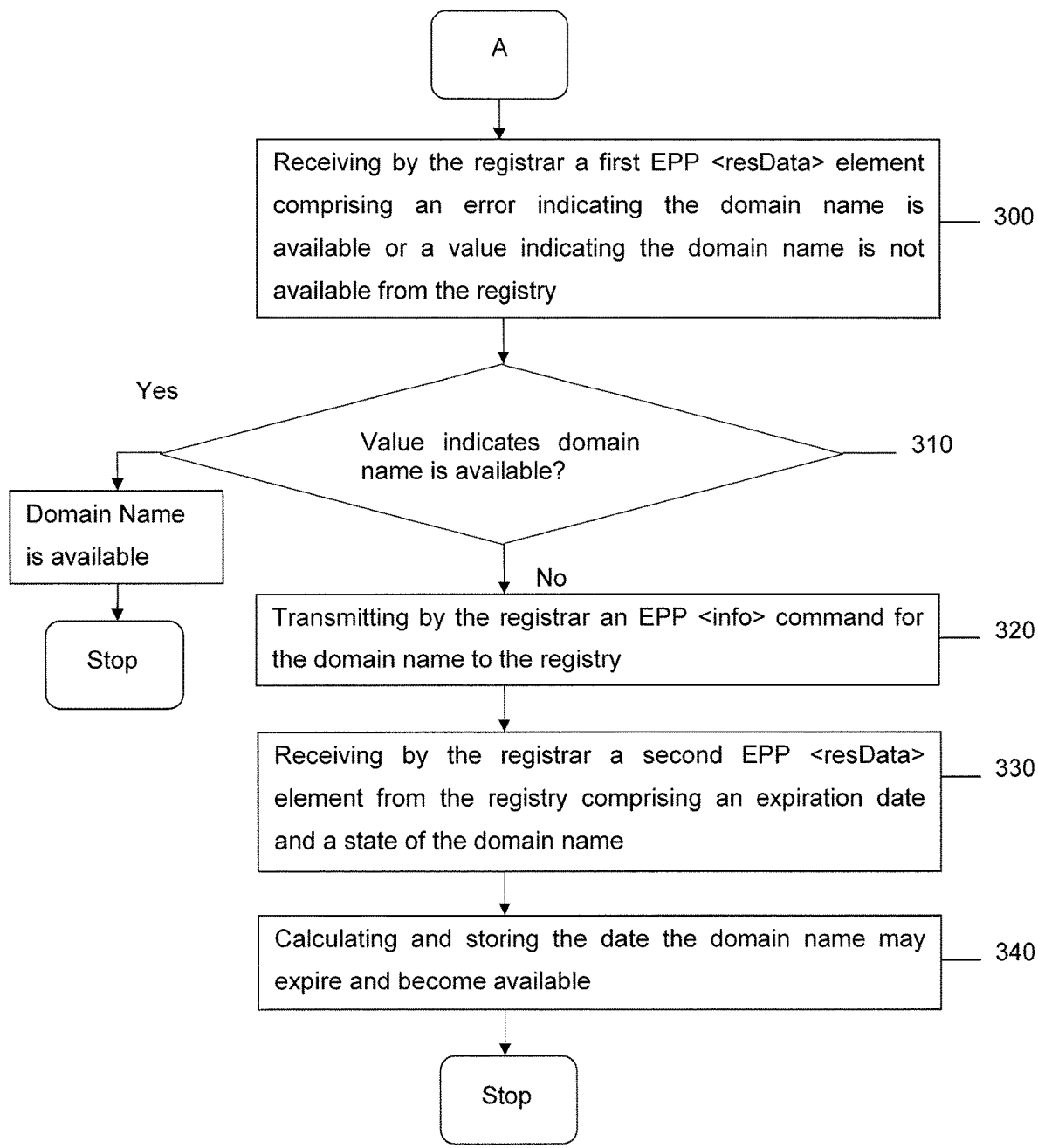

FIGS. 2 and 3 illustrate a process to quickly and reliably determine a registration status of one or more domain names while reducing the amount of resources used in making the determination. The strategy for this embodiment is to perform the steps that are the quickest, use the fewest resources and/or the most likely to return a definitive answer before performing steps that are slower and/or are less likely to return a definitive answer. In this manner, the registration status of one or more domain names may be quickly and reliably found while using as few resources as possible in making the determination.

A registrar 120 may receive or download one or more DNS parent zone 112 files, i.e., zone files created by one or more registries. Each zone file in the plurality of zone files comprises a plurality of registered domain names for a single TLD. A process to determine a registration status of a domain name may start by a registrar 120 determining whether or not a domain name is in the zone file downloaded from the registry 110. (Step 200)

Any domain name found in the zone file for its TLD may be considered as registered and unavailable for registration. If the domain name is found in the zone file, the process may be stopped for that domain name. Data reflecting that the domain name is registered may be saved and stored in a database 123. The process may then be stopped and possibly restarted for a different domain name.

However, any domain name not found in the zone file may or may not be registered. This may occur, as an example, if the domain name is registered, but a DNS entry has not been created for the domain name in the zone file. This may result in the domain name not being in the zone file, but still be registered. Thus, if the domain name is not in the zone file, its status is not definitively known and the process is preferably continued. (Step 210)

As the registrar 120 registers domain names to registrants, the registrar 120 may create and save a DNS zone file 122 of registered domain names. The registrar 120 may determine whether or not the domain name is in the DNS zone file 122 created by the registrar 120. (Step 220) Any domain name found in the DNS zone file 122 created by the registrar 120 may be considered as registered and unavailable for registration. If the domain name is found in the DNS zone file 122 created by the registrar 120, the process may be stopped for that domain name. Data reflecting that the domain name is registered may be saved and stored in the database 123. The process may then be restarted for a different domain name.

However, any domain name not found in the DNS zone file 122 created by the registrar 120 may or may not be registered. As an example, the domain name may be registered by a different registrar so that the domain name might not be in the DNS zone file 122 created by the registrar 120, but still be registered by the different registrar. Thus, if the domain name is not in the DNS zone file 122 created by the registrar 120, its status is not definitively known and the process is preferably continued. (Step 230)

If the domain name is not in the zone file created by the authoritative registry 110 and downloaded by the registrar 120 and the domain name is not in the zone files created by the registrar 120, the status of the domain name is not definitively known. The registrar 120 may determine the registration status of the domain name by sending Extensible Provisioning Protocol (EPP) commands, preferably the EPP <check> command and the EPP <info> command, to the registry 110 and receiving information (preferably in the form of an EPP <resData> element) back from the registry 110.

Specifically, the registrar 120 may transmit an EPP <check> command for the domain name to the registry 110. (Step 240) The registry 110 may receive the EPP <check> command, review the records for the domain name (if any exist) and transmit information back to the registrar 120 in response to the EPP <check> command.

The registrar 120 may receive a first EPP <resData> element comprising an error indicating the domain name is available or a value indicating the domain name is not available from the registry 110. (Step 300) If the first EPP <resData> element comprises an error, the domain name may be considered as available for registration. Data reflecting that the domain name is available may be saved and stored in the database 123. The domain name may be designated as available and in some embodiments, offered to a potential domain name registrant 100 as available for registration.

If the registrar 120 receives a value indicating the domain name is not available (such as registered or in the pending delete process), the domain name may be definitively considered as not available. (Step 310) The process may be stopped and optionally restarted for a different domain name.

In some embodiments, upon receiving a value indicating the domain name is not available, additional information regarding the domain name may be desired. For example, the registrar 120 may desire to know if the domain name is in the pending delete process and/or when the domain name is likely to expire and become available for registration. To receive the additional information, the registrar 120 may transmit an EPP <info> command for the domain name to the registry 110. (Step 320)

The registry 110 may receive the EPP <info> command for the domain name and review the records (if they exist) associated with the domain name. The registry 110 may then transmit a second EPP <resData> element to the registrar 120 for the domain name.

The registrar 120 may receive the second EPP <resData> element from the registry 110. The EPP <resData> may comprise an expiration date and a state of the domain name. (Step 330) The registrar 120 may calculate a date the domain name may become available and store the date/information in the database 123. (Step 340)

Figure 8:
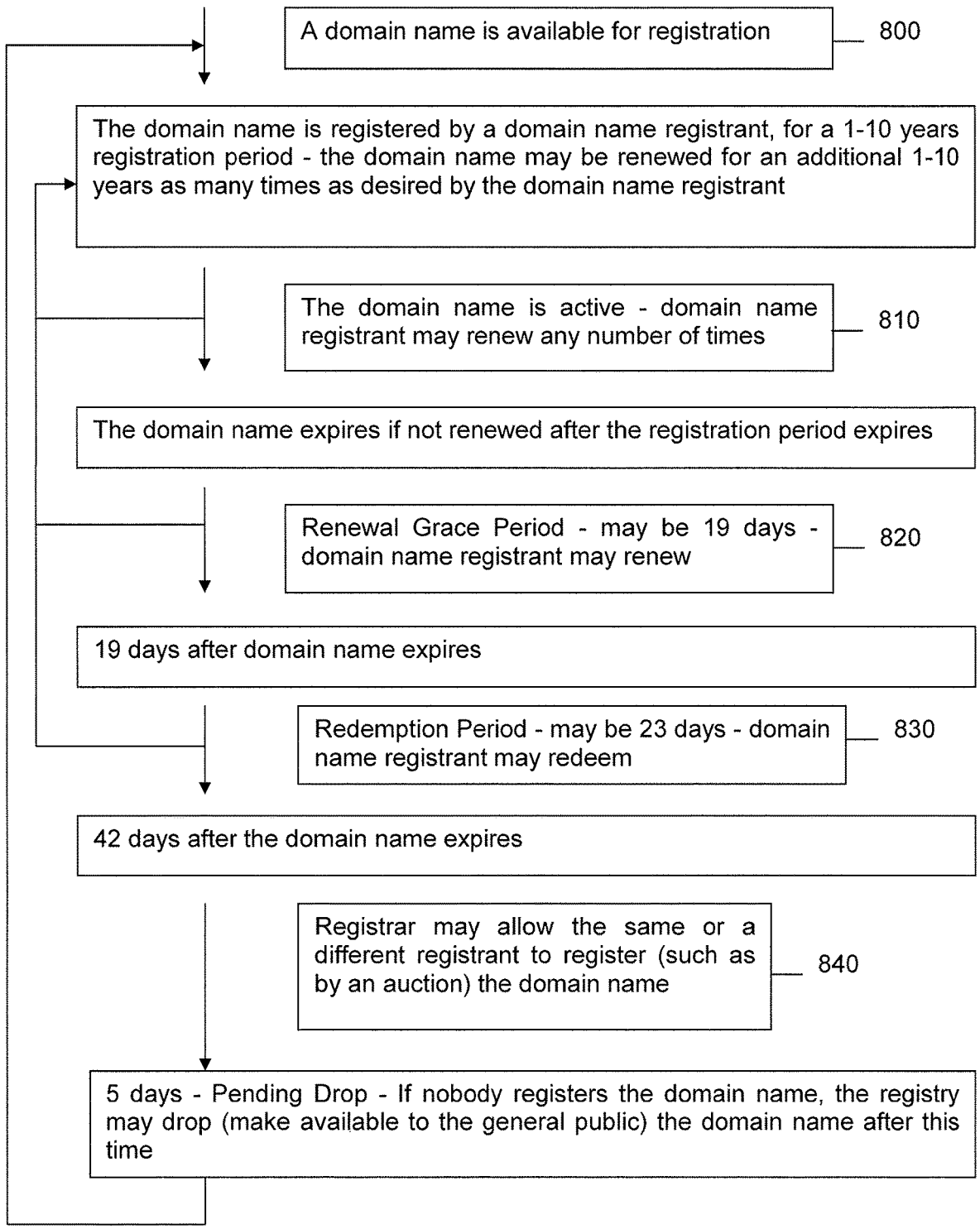
FIG. 8 is an example of a domain name life cycle.

FIG. 8 illustrates a non-limiting example of a domain name life cycle. The EPP <resData> element preferably reflects, indicates or states where the domain name is in the domain name life cycle. Each TLD has rules, generally created and enforced by the registry 110 authoritative for the TLD, regarding the life cycle of the domain names that have that particular TLD. The rules may be different for different TLDs and the rules may even be different for the same TLD over time. In addition, the EPP <resData> element may comprise different data formats for different registries.

The life cycle of a domain name will now be discussed with reference to FIG. 8. Most domain names start out as an available domain name. (Step 800) The available domain name may be initially registered for some number of years, often limited to between one and 10 years in yearly increments. The domain name may thereafter be reregistered for any number of additional time periods (which may, as an example, also be limited to between one and 10 years in yearly increments). In effect, this allows the domain name registrant 100 to keep the domain name perpetually registered if so desired by continuing to reregister the domain name for additional registration periods. While registered, the domain name is considered active. (Step 810) The domain name will typically be in the DNS parent zone and the DNS zone file while the domain name is registered/active.

If the initial registration period or a subsequent registration period expires and the domain name is not reregistered, the domain name may enter a grace period as defined by the registry 110. As a typical example, the grace period may last between zero and 45 days. In the embodiment illustrated in FIG. 8, the grace period lasts for 19 days. (Step 820) The registrant 100 typically may reregister the domain name during the grace period with no or only a small additional fee. Depending on the TLD, the domain name may or may not be in the DNS parent zone 112 or the DNS zone file 122 during the grace period.

If the domain name is not reregistered during the grace period, the domain name may enter a redemption period (also known as a redemption grace period) as defined by the registry 110. As an example, the redemption period may last up to 30 days. In the embodiment illustrated in FIG. 8, the redemption period lasts 23 days. (Step 830) The registrant 100 typically may reregister the domain name during the redemption period, but with a fee that is typically larger than the fee imposed (if any) during the grace period. The domain name is typically not in the DNS parent zone 112 or the DNS zone file 122 during the redemption period.

If the domain name is not reregistered during the redemption period, the domain name registrant 100 will typically lose all rights to the domain name and the registrar 120 may auction the domain name or allow the domain name to go into a pending delete period or pending drop as defined by the registry 110. (Step 840) The pending delete period or pending drop is decided by the registry 110 and is typically five days. After the five days, the domain name may once again be considered available for registration. During the Pending delete period or pending drop the domain name is not in the DNS parent zone 112 or the DNS zone file 122.

Figure 4:
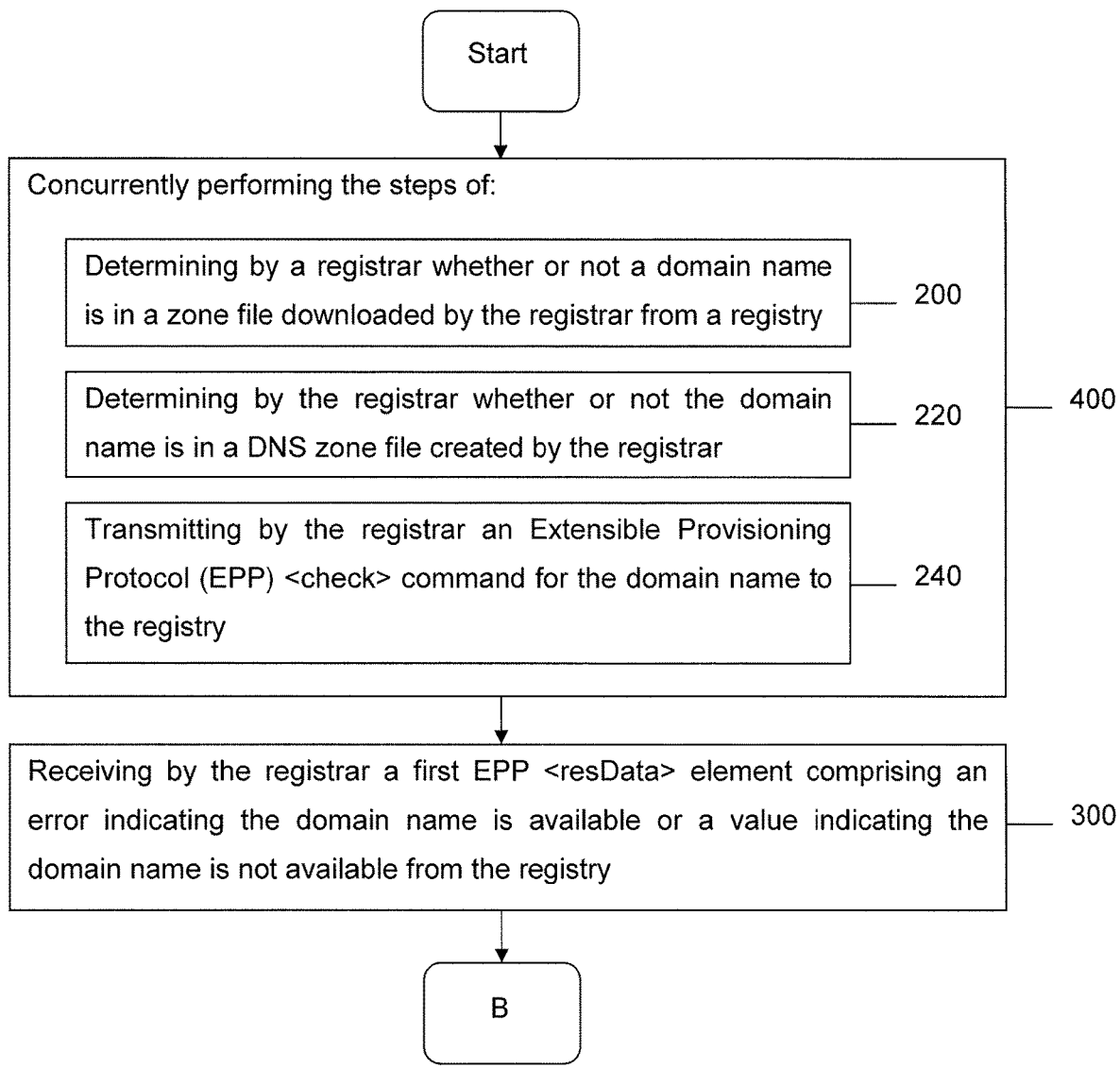
FIGS. 4-7 are flowcharts illustrating a method that reduces the amount of time used to determine a registration status for one or more domain names.
Figure 5:
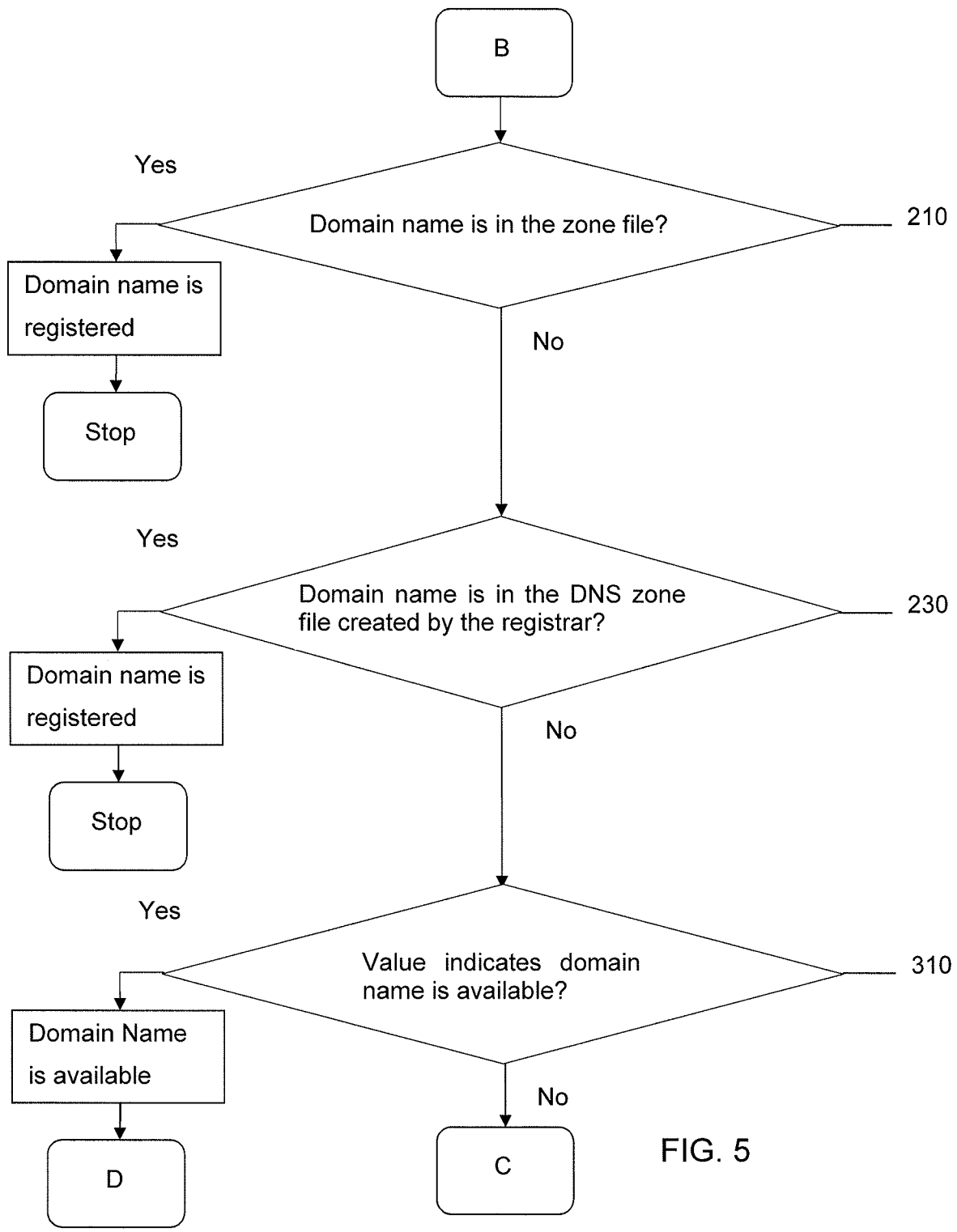
Figure 6:
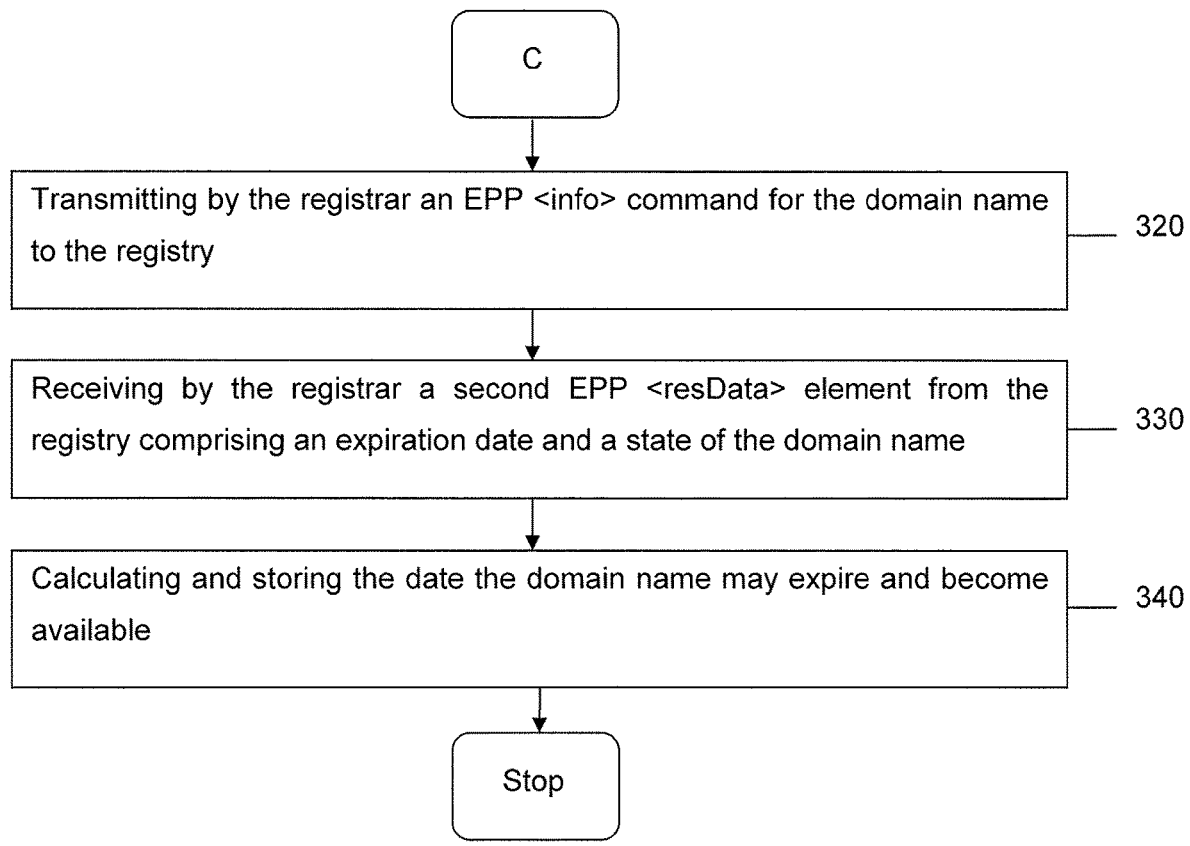

FIGS. 4-6 illustrate another process to quickly and reliably determine a registration status of one or more domain names that more fully utilizes the available resources of the registrar 120. The strategy for this embodiment is to concurrently perform several processes so that even if the definitive answer only comes from the slowest step, the slowest step will be started, along with all the other concurrently performed processes, as early as possible. This embodiment may find the answer more quickly than the embodiment illustrated in FIGS. 2-3, but may also use more resources of the registrar 120.

In this embodiment, three processes are concurrently performed. (Step 400) First, a registrar 120 determines whether or not a domain name is in a zone file downloaded by the registrar 120 from a registry 110. (Step 200) Second, the registrar 120 determines whether or not the domain name is in a DNS zone file 122 created by the registrar 120. (Step 220) And third, the registrar 120 transmits an EPP <check> command for the domain name to the registry 110. (Step 240)

The three above described processes are hereby defined to be concurrently performed if the three processes are started at substantially the same time or in rapid succession, the three processes are started without waiting for the results of the other processes and there is at least some time period when all three processes are being actively performed. The three processes may take substantially different amounts of time to complete, but are still considered being concurrently performed if the three processes meet the other conditions.

The registry 110 may receive the EPP <check> command, review the records for the domain name (if any exist) and transmit a first EPP <res Data> element comprising an error indicating the domain name is available or a value indicating the domain name is not available back to the registrar 120 in response to the EPP <check> command. The registrar 120 may receive from the registry 110 the first EPP <resData> element. (Step 300)

The results of the three concurrently performed processes may be analyzed in any order, but are preferably analyzed as the results are received or on the basis of which is the most likely to give a definitive answer regarding the registration status of the domain name. As an example, the results of the three concurrently performed processes are performed in the order of Step 500, Step 510 and then Step 520 in FIG. 5, but may be concurrently performed, performed as the results are received or may be performed in any other desired order.

Any domain name found in the zone file for its TLD downloaded from the registry 110 may be considered as registered and unavailable for registration. If the domain name is found in the zone file, the process may be stopped for that domain name. Data reflecting that the domain name is registered may be saved and stored in the database 123. The process may then be stopped and/or restarted for a different domain name.

However, any domain name not found in the zone file may or may not be registered. As an example, the domain name may be registered, but if a DNS entry has not been created for the domain name in the zone file, the domain name might not be in the zone file, but still be registered. Thus, if the domain name is not in the zone file downloaded from the registry 110, the domain name's status is not definitively known and the process is preferably continued. (Step 210)

Any domain name found in the DNS zone file 122 created by the registrar 120 may be definitively considered as registered and unavailable for registration. If the domain name is found in the DNS zone file 122 created by the registrar 120, the process may be stopped for that domain name. Data reflecting that the domain name is registered may be saved and stored in the database 123. The process may then be restarted for a different domain name.

However, any domain name not found in the DNS zone file 122 created by the registrar 120 may or may not be registered. As an example, the domain name may be registered by a different registrar so that the domain name might not be in the DNS zone file 122 created by the registrar 120, but still be registered by the different registrar. Thus, if the domain name is not in the DNS zone file 122 created by the registrar 120, its status is not definitively known and the process is preferably continued. (Step 230)

If the first EPP <resData> element comprises an error, the domain name may be considered as available for registration. Data reflecting that the domain name is available may be saved and stored in the database 123. The domain name may be designated as available and in some embodiments, offered to a potential domain name registrant 100 as available for registration. The process may be restarted for a different domain name.

Figure 7:
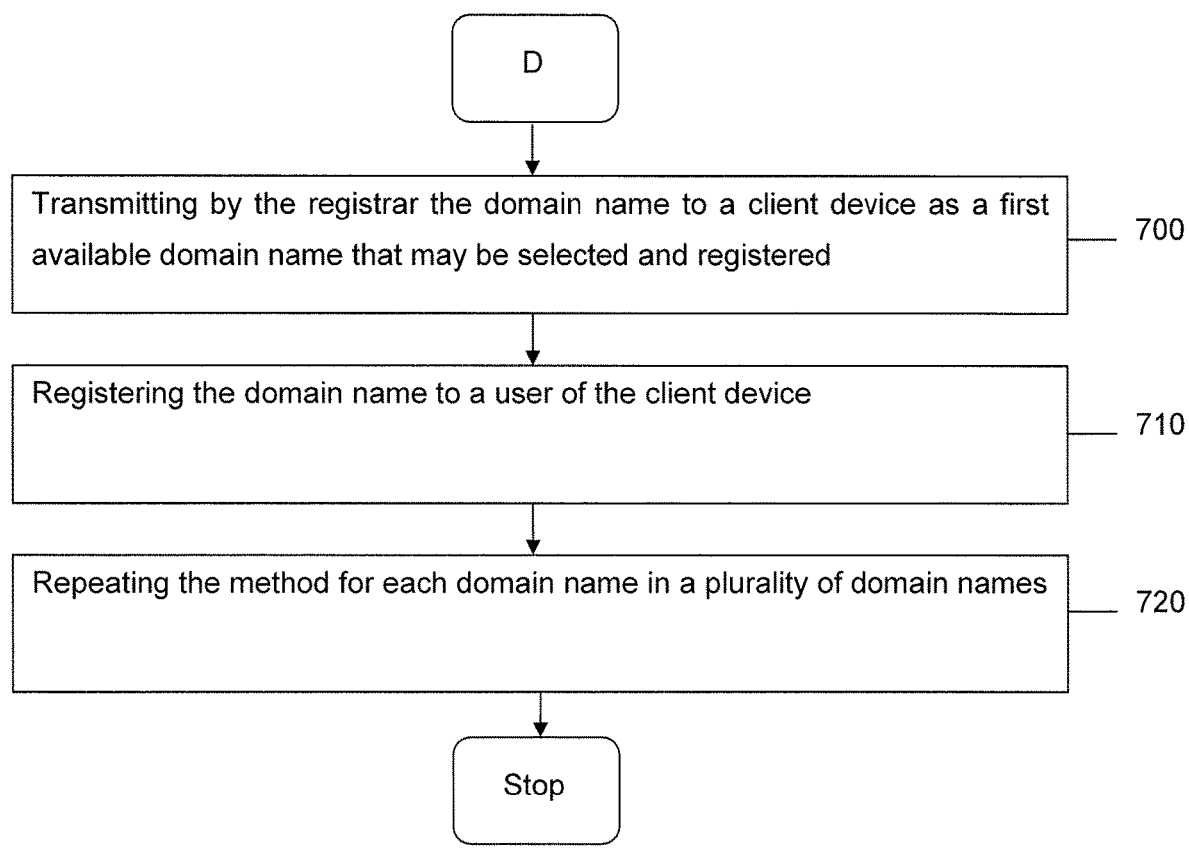

Referring to FIG. 7, the registrar 120 may transmit the domain name to a client device 105 as an available domain name that may be selected and registered. (Step 700) If selected by a domain name registrant 100, the registrar 120 may register the domain name to the domain name registrant 100. (Step 710) The process may then be repeated for additional domain names. (Step 720)

If the registrar 120 receives a value indicating the domain name is not available (such as registered or in the pending delete process), the domain name may be considered as not available. (Step 310) The process may be stopped and/or optionally restarted for a different domain name.

In some embodiments, upon receiving a value indicating the domain name is not available, additional information regarding the domain name may be desired. For example, the registrar 120 may desire to know if the domain name is in the pending delete process and/or when the domain name is likely to expire and become available for registration. To receive the additional information, the registrar 120 may transmit an EPP <info> command for the domain name to the registry 110. (Step 320)

The registry 110 may receive the EPP <info> command for the domain name and review the records (if they exist) associated with the domain name. The registry 110 may then transmit a second EPP <resData> element to the registrar 120 for the domain name.

The registrar 120 may receive the second EPP <resData> element from the registry 110. The second EPP <resData> may comprise an expiration date and a state of the domain name. (Step 330) The registrar 120 may calculate a date the domain name may become available and store the date/information in a database 123. (Step 340)

Once a domain name is registered to the registrant 100, the registrant 100 may desire to have the domain name point to a website owned and operated by the registrant 100. This allows a user to enter the domain name into a browser and then enables the browser to access the content on the website pointed to by the domain name.

The described processes may be repeated for a plurality of domain names to determine which domain names in the plurality of domain names are available and which domain names in the plurality of domain names are registered or unavailable. (Step 720)

Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A system, comprising:
a registrar comprising a plurality of hardware servers, a plurality of hardware databases, a plurality of dedicated Internet connections to a registry and general Internet connections configured to register a plurality of domain names to a plurality of domain name registrants and to:
rank a plurality of data sources based on a definitiveness of each data source of the plurality of data sources, so as to obtain a ranking hierarchy,
wherein the plurality of data sources of the ranking hierarchy comprises:
a zone file downloaded by the registrar from a registry;
a domain name system (DNS) zone file created by the registrar; and
at least one result of an Extensible Provisioning Protocol (EPP)<check> command of the registry;
wherein the at least one result of the Extensible (EPP) <check> command of the registry comprises a first EPP <resData> element comprising an error indicating the domain name is available or a value indicating the domain name is not available;
receive a request to determine whether a domain name has been registered,
concurrently generate a plurality of inquiries to the plurality of data sources, the plurality of inquiries comprising:
a determination of whether or not a domain name is in a zone file,
wherein the zone file is downloaded by the registrar from the registry;
a determination of whether or not the domain name is in a domain name system (DNS) zone file created by the registrar, and
a transmission of the Extensible Provisioning Protocol (EPP) <check> command for the domain name to the registry,
receive results of the plurality of inquiries from the plurality of data sources;
order the results of the plurality of inquires, based on the ranking hierarchy, so as to provide ordered results;
upon receiving the ordered results
transmit an EPP <info> command for the domain name to the registry, and
receive from the registry a second EPP <resData> element comprising an expiration date and a state of the domain name.

2. The system of claim 1, wherein the registrar is further configured to:
determine whether or not a second domain name is in the zone file downloaded by the registrar from a registry; and
upon determining that the second domain name is in the zone file, store data in a database in the plural of hardware databases indicating the second domain name is registered.

3. The system of claim 1, wherein the registrar is further configured to:
determine whether or not a second domain name is in a zone file downloaded by the registrar from the registry; and
upon determining that the second domain name is not in the zone file:
determine whether or not the second domain name is in the DNS zone file created by the registrar, and
upon determining that the second domain name is in the DNS zone file created by the registrar, store data in a database in the plurality of hardware databases indicating the second domain name is registered.

4. The system of claim 1, wherein the registrar is further configured to:
determine whether or not a second domain name is in the zone file downloaded by the registrar from the registry; and
upon determining that the second domain name is not in the zone file:
determine whether or not the second domain name is in the DNS zone file created by the registrar,
upon determining that the second domain name is not in the DNS zone file created by the registrar:
transmit a second EPP <check> command for the second domain name to the registry,
receive from the registry a third EPP <resData> element comprising an error indicating the second domain name is available or a value indicating the second domain name is not available, and
upon receiving the error indicating the second domain name is available, transmit by the registrar the second domain name to the client device as an available second domain name that may be selected and registered.

5. The system of claim 1, wherein the registrar is further configured to store in a database in the plurality of hardware databases the expiration date and the status of the domain name in a database.

6. The system of claim 1, wherein the registrar is further configured to determine an availability for each domain name in a plurality of domain names.

7. A method, comprising
performing the steps of:
ranking a plurality of data sources based on a definitiveness of each data source of the plurality of data sources, so as to obtain a ranking hierarchy,
wherein the plurality of data sources of the ranking hierarchy comprises:
a zone file downloaded by the registrar from a registry;
a domain name system (DNS) zone file created by the registrar; and
a result of an Extensible Provisioning Protocol (EPP) <check> command of the registry;
wherein the result of the Extensible (EPP)<check> command of the registry comprises a first EPP <resData> element comprising an error indicating the domain name is available or a value indicating the domain name is not available;
receiving a request to determine whether a domain name has been registered,
concurrently generating a plurality of inquiries to the plurality of data sources, the plurality of inquiries comprising:
a determination by a registrar whether or not a domain name is in a zone file downloaded by the registrar from a registry,
a determination by the registrar whether or not the domain name is in a domain name system (DNS) zone file created by the registrar, and
a transmission by the registrar an Extensible Provisioning Protocol (EPP)<check> command for the domain name to the registry;
receiving the results of the plurality of inquires;
ordering the results of the plurality of respective inquires based on the ranking hierarchy to provide ordered results;
upon an indication by the ordered results that: the domain name is not in the zone file, that the domain name is not in the DNS zone file created by the registrar, and that the first EPP <resData> element comprises a value indicating the domain name is not available:
transmitting by the registrar to the registry an EPP <info> command for the domain name, and
receiving by the registrar from the registry a second EPP <resData> element comprising an expiration date and a state of the domain name.

8. The method of claim 7, further
comprising: concurrently performing the steps of:
determining by the registrar whether or not a second domain name is in the zone file downloaded by the registrar from the registry,
determining by the registrar whether or not the second domain name is in the DNS zone file created by the registrar, and
transmitting by the registrar a second EPP <check> command for the second domain name to the registry;
receiving by the registrar from the registry a third EPP <resData> element comprising an error indicating the second domain name is available or a value indicating the second domain name is not available; and
upon determining by the registrar that the second domain name is in the zone file, storing data indicating the second domain name is registered.

9. The method of claim 7, further
comprising: concurrently performing the steps of:
determining by the registrar whether or not a second domain name is in the zone file downloaded by the registrar from the registry,
determining by the registrar whether or not the second domain name is in the DNS zone file created by the registrar, and
transmitting by the registrar a second EPP <check> command for the second domain name to the registry;
receiving by the registrar from the registry a third EPP <resData> element comprising an error indicating the second domain name is available or a value indicating the second domain name is not available; and
upon determining by the registrar that the second domain name is in the DNS zone file created by the registrar, storing data indicating the second domain name is registered.

10. The method of claim 7, further
comprising: concurrently performing the steps of:
determining by the registrar whether or not a second domain name is in the zone file downloaded by the registrar from the registry,
determining by the registrar whether or not the second domain name is in the DNS zone file created by the registrar, and
transmitting by the registrar a second EPP <check> command for the second domain name to the registry;
receiving by the registrar from the registry a third EPP <resData> element comprising an error indicating the second domain name is available or a value indicating the second domain name is not available; and
upon receiving by the registrar the error indicating the second domain name is available, transmitting by the registrar the second domain name to a client device as an available domain name that may be selected and registered.

11. The method of claim 7, further comprising the step of storing the expiration date and the status of the domain name in a database.

12. The method of claim 7, further comprising the step of repeating the method of claim 1 for each domain name in a plurality of domain names.

13. A method, comprising
performing the steps of:
ranking a plurality of data sources based on a definitiveness of each data source of the plurality of data sources, so as to obtain a ranking hierarchy,
wherein the plurality of data sources of the ranking hierarchy comprises:
a zone file downloaded by the registrar from a registry;
a domain name system (DNS) zone file created by the registrar; and
a result of an Extensible Provisioning Protocol (EPP) <check> command of the registry;
wherein the result of the Extensible (EPP) <check> command of the registry comprises a first EPP <resData> element comprising an error indicating the domain name is available or a value indicating the domain name is not available;
receiving a request to determine whether a domain name has been registered, concurrently generating a plurality of inquiries to the plurality of data sources, the plurality of inquiries comprising:
- a determination by a registrar whether or not a domain name is in the zone file downloaded by the registrar from a registry,
- a determination by the registrar whether or not the domain name is in the domain name system (DNS) zone file created by the registrar, and
- a transmission by the registrar of the Extensible Provisioning Protocol (EPP)<check> command for the domain name to the registry;

receiving results of the plurality of inquiries from the plurality of data sources;

ordering the results of the plurality of inquires based on the ranking hierarchy, so as to provide ordered results;

upon an indication by the ordered results that: the domain name is not in the zone file, that the domain name is not in the DNS zone file created by the registrar, and that the first EPP <resData> element comprises an error indicating the domain name is available, transmitting by the registrar the domain name to a client device as a first available domain name that may be selected and registered.

14. The method of claim 13, further comprising: concurrently performing the steps of:
- determining by the registrar whether or not a second domain name is in the zone file downloaded by the registrar from the registry,
- determining by the registrar whether or not the second domain name is in the DNS zone file created by the registrar, and
- transmitting by the registrar a second EPP <check> command for the second domain name to the registry;

receiving by the registrar from the registry a second EPP <resData> element comprising an error indicating the second domain name is available or a value indicating the second domain name is not available; and upon determining by the registrar that the second domain name is in the zone file, storing data indicating the second domain name is registered.

15. The method of claim 13, further comprising: concurrently performing the steps of:
- determining by the registrar whether or not a second domain name is in the zone file downloaded by the registrar from the registry,
- determining by the registrar whether or not the second domain name is in the DNS zone file created by the registrar, and
- transmitting by the registrar a second EPP <check> command for the second domain name to the registry;

receiving by the registrar from the registry a second EPP <resData> element comprising an error indicating the second domain name is available or a value indicating the second domain name is not available; and upon determining by the registrar that the second domain name is in the DNS zone file created by the registrar, storing data indicating the second domain name is registered.

16. The method of claim 13, further comprising: concurrently performing the steps of:
- determining by the registrar whether or not a second domain name is in the zone file downloaded by the registrar from the registry,
- determining by the registrar whether or not the second domain name is in the DNS zone file created by the registrar, and
- transmitting by the registrar a second EPP <check> command for the second domain name to the registry;

receiving by the registrar from the registry a second EPP <resData> element comprising an error indicating the second domain name is available or a value indicating the second domain name is not available; and upon receiving by the registrar the error indicating the second domain name is available, transmitting by the registrar the second domain name to the client device as a second available domain name that may be selected and registered.

17. The method of claim 13, further comprising the step of registering the domain name to a user of the client device.

18. The method of claim 13, further comprising the step of repeating the method of claim 1 for each domain name in a plurality of domain names.

19. The system of claim 1, wherein the ranking hierarchy is configured to rank the result from the zone file downloaded by the registrar from a registry higher than the result from the DNS zone file created by the registrar.

20. The system of claim 19, wherein the ranking hierarchy is configured to rank the result from the DNS zone file created by the registrar higher than the result of the EPP <check> command of the registry.

* * * * *